United States Patent [19]
Husz

[11] 3,759,008
[45] Sept. 18, 1973

[54] INSULATED EXPANSION JOINT
[75] Inventor: Charles Husz, Chicago, Ill.
[73] Assignee: Transco Inc., Chicago, Ill.
[22] Filed: June 28, 1971
[21] Appl. No.: 157,151

[52] U.S. Cl.................. 52/573, 285/226, 285/47, 52/249
[51] Int. Cl............................................ F16l 27/12
[58] Field of Search.................... 285/226, 229, 47; 138/148, 149; 52/573

[56] References Cited
UNITED STATES PATENTS

| 2,913,010 | 11/1959 | Whitney | 285/226 |
| 3,648,734 | 3/1972 | Waite | 138/148 |
| 2,732,227 | 1/1956 | Kaiser | 285/47 |
| 2,752,172 | 6/1956 | Ziebold | 285/226 |
| 3,016,999 | 1/1962 | Glasoe | 138/148 |
| 3,186,742 | 6/1965 | Frankel | 285/226 |
| 3,254,910 | 6/1966 | Poole | 285/226 |
| 3,659,390 | 5/1972 | Blzer | 52/573 |

FOREIGN PATENTS OR APPLICATIONS

| 342,692 | 10/1921 | Germany | 285/226 |

Primary Examiner—Frank L. Abbott
Assistant Examiner—H. E. Raduazo
Attorney—Edward C. Threedy

[57] ABSTRACT

An expansion joint and support for a prefabricated metallically faced insulating panel used in the construction of duct work, with the joint comprising an expandable accordian-like or pleated metal plate providing a spaced support which extends beyond either side edge of the expandable plate, with the support being connected across the face of the plate for free vertical and horizontal movement relative thereto.

2 Claims, 3 Drawing Figures

PATENTED SEP 18 1973
3,759,008
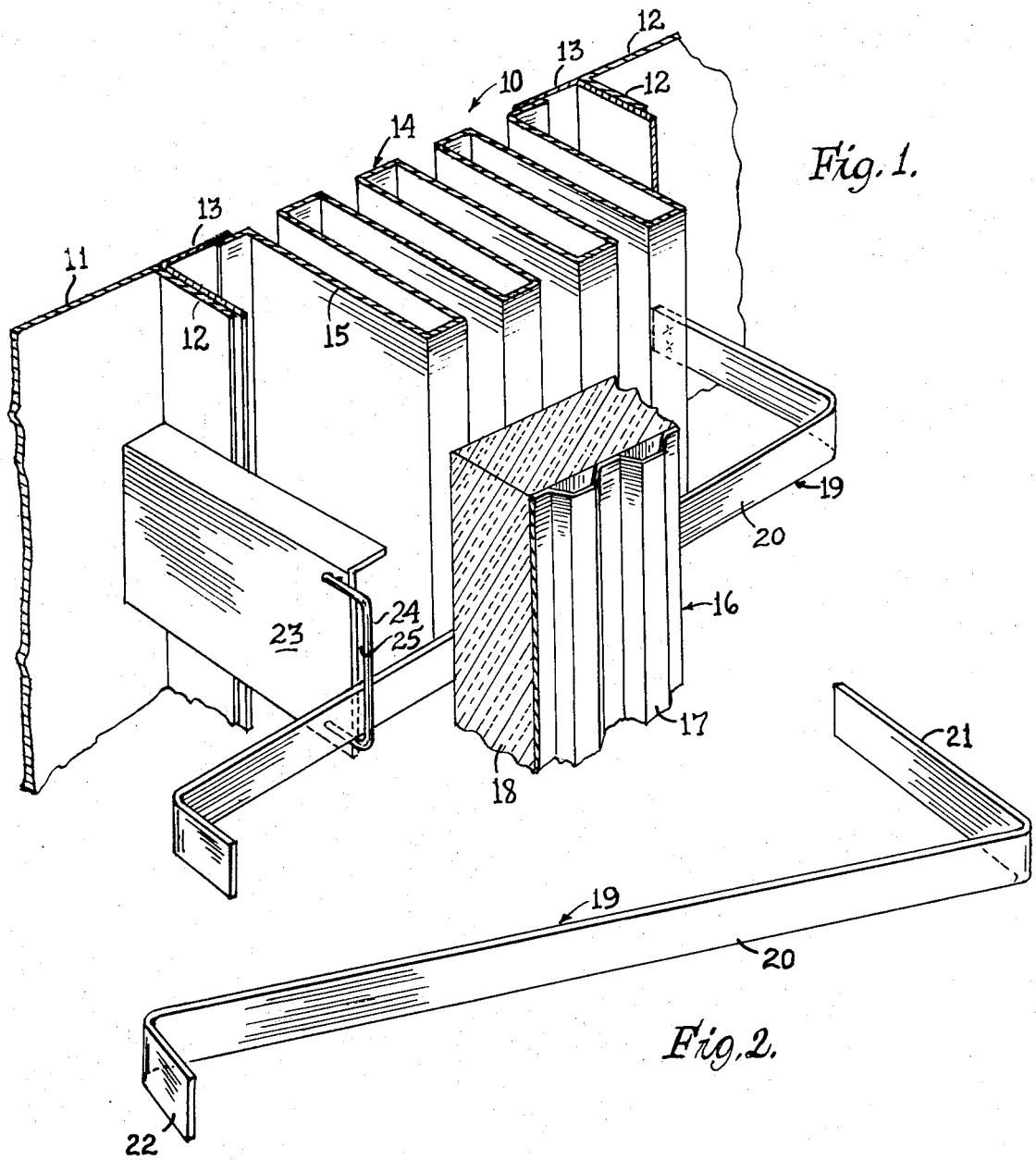
Fig. 1.
Fig. 2.
Fig. 3.
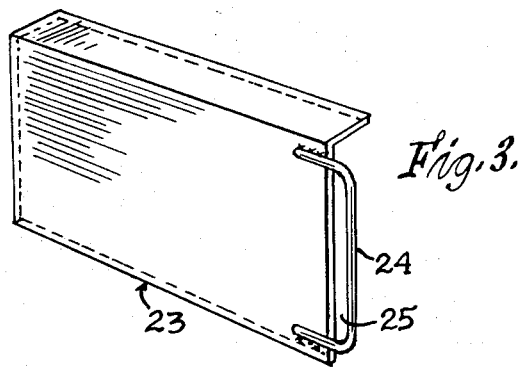
INVENTOR,
CHARLES HUSZ
BY Edward C. Threedy.
HIS ATTORNEY-

INSULATED EXPANSION JOINT

SUMMARY OF THE INVENTION

An insulated expansion joint for a duct that includes an expandable accordian-like or pleated section constructed from a metallic plate interposed in such duct. An insulating panel support is carried by the duct in spaced relation to and extending beyond the edges of the expansion plate, by which such joint can be covered with an insulation during any expanding or contracting movement of the duct. The support comprises an angled bar having one end fixedly attached to the duct at one side of the expandable plate, with a medial portion that extends across the full width of the expandable plate and has its free end retained by a connector carried by the duct at the oppostie side of the expandable plate, whereby the support has limited vertical and horizontal movement corresponding to that of the expanding or contracting duct, without interfering with the expansion joint. Such support will carry a prefabricated insulated panel and maintain it in proper functional relationship with respect to the expansion joint.

GENERAL DESCRIPTION

The invention is best illustrated in the accompanying drawings showing its preferred embodiment, and in which:

FIG. 1 is a fragmentary sectional perspective view of the parts of the invention in their assembled relation;

FIG. 2 is a perspective view of the insulated panel support;

FIG. 3 is a perspective view of the limited restraining bracket for the insulated panel support.

In the construction of many atomic reactors as well as heating and condensing units, a ductwork is provided which must be provided with an expansion joint that permits relative contracting and expansion of the duct without interfering with an external insulating cover. To this end, this invention is directed and, as shown in FIG. 1, the insulated expansion joint 10 is interposed in the longitudinal length of a duct member 11 which is provided with spaced apart laterally extending end flanges 12.

Welded or connected in a suitable manner to these flanges 12, are a pair of opposing angled members 13 which in turn suport the expansion joint 10.

The expansion joint 10, as shown, is a metallic plate 14 provided with a series of accordian-like pleats 15 each of which has an equal length which is greater than the flanges 12 provided by the confronting ends of the duct 11. The accordian-like pleats 15 extend outwardly of the interior of the duct 11 so as not to cause an obstruction therein, yet permit relative contracting and expanding movement between the confronting ends of the duct 11.

As in most installations, the duct 11 is provided with a spaced insulated cover which normally comprises a prefabricated insulating panel 16 consisting of a corrugated outer metallic face 17 that covers a batt 18 of insulating material. This insulating panel 16 may be of the free-standing type shown and described in Pat. No. 3,412,518.

To maintain the insulating panel 16 in spaced relation to the expansion joint 10, there is provided a panel support 19. As viewed in FIG. 2, this support 19 may be constructed from a substantially rectangularly shaped metal bar and provides a medial portion 20 which is of a length to extend beyond the distance between the flanges 12 as provided by the confronting edges of the duct 11. At one end of the medial portion 20, there is provided a base leg 21 which is adapted to be connected to one of the flanges 12 in a manner to extend parallelly thereto so as to dispose the medial portion 20 in spaced relation across the width of the expansion joint 10. The opposite end of the medial portion 20 of the support 19 is angularly bent in a direction opposite to that of the base leg 21 so as to provdide an arresting finger 22.

To the other flange 12 there is mounted a plate 23 which provides at its free end a U-shaped keeper bracket 24. The medial portion 20 of the support 19 is adapted to extend through the keeper bracket 24 which provides an open chamber 25 of a size that is thicker and wider than the support 19, so that the latter has a limited free movement therein. Adapted to be carried by the support 19 is the insulating panel 16 in a manner such that it extends well beyond either edge of the expansion joint 10. By this arrangement, any contracting or expanding movement of the duct is absorbed by the accordian pleats of the expansion joint 10, with corresponding movement of the support 19 carried by one edge of the duct relative to the opposite edge of the duct and the insulating panel 16 supported thereby.

By this arrangement the support 19 and the insulating panel 16 are permitted to have a free limited vertical or horizontal movement that will correspond to any type of contracting or expanding movement of the duct, while maintaining the insulation of the expansion joint interposed within such duct.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. An insulated expansion joint to be interposed between the confronting edges of a duct that provides externally extending end flanges, comprising
   a. support means attached to the end flanges of the duct for supporting therebetween an expansion duct,
   b. a metallic plate mounted between said support means and having an expandable portion in spaced parallel relation to the end flanges of the duct,
   c. an elongated substantially Z-shaped bar providing angled end members connected to said supporting means and having its medial portion extending across the face of and in spaced relation to said expandable portion of said plate,
   d. a prefabricated insulating panel extending across the face of said expandable portion of said plate and held in spaced relation thereto by said bar,
   e. and a bar-restraining member carried by said support means and attached to one of the end flanges and providing means for permitting said bar to move vertically and horizontally relative thereto in response to the expansion and contraction of the expandable portion of the duct.

2. An insulated expansion joint as defined by claim 1, wherein said means provided by said bar-restraining member comprises a U-shaped keeper bracket connected to said one of said end flanges of the duct, with said bracket movably containing one angled end of said Z-shaped bar for free vertical and horizontal movement therethrough in response to the movement of the duct.

* * * * *